(12) United States Patent
Maciver et al.

(10) Patent No.: US 9,482,282 B2
(45) Date of Patent: Nov. 1, 2016

(54) BEARING FOR A ROTARY MACHINE

(71) Applicant: ZiLift Holdings, Limited, Aberdeen (GB)

(72) Inventors: Ivor Maciver, Aberdeenshire (GB); Kenneth John Sears, Grandhome (GB)

(73) Assignee: ZiLift Holdings, Ltd., Aberdeen (GB)

(*) Notice: Subject to any disclaimer, the term of this patent is extended or adjusted under 35 U.S.C. 154(b) by 124 days.

(21) Appl. No.: 14/464,726

(22) Filed: Aug. 21, 2014

(65) Prior Publication Data
US 2016/0053807 A1 Feb. 25, 2016

(51) Int. Cl.
| | |
|---|---|
| *F16C 35/02* | (2006.01) |
| *F16C 17/04* | (2006.01) |
| *F16C 27/02* | (2006.01) |
| *F16J 15/32* | (2016.01) |
| *F16C 17/02* | (2006.01) |
| *F16C 33/66* | (2006.01) |
| *F16C 33/74* | (2006.01) |
| *F16C 33/04* | (2006.01) |

(52) U.S. Cl.
CPC .............. *F16C 35/02* (2013.01); *F16C 17/02* (2013.01); *F16C 27/02* (2013.01); *F16C 33/043* (2013.01); *F16C 33/6677* (2013.01); *F16C 33/74* (2013.01); *F16C 2226/12* (2013.01); *F16C 2380/26* (2013.01)

(58) Field of Classification Search
CPC ...... F16C 17/02; F16C 25/02; F16C 27/063; F16C 33/103; F16C 33/1045; F16C 33/106; F16C 33/6659; F16N 9/02; F16J 15/32; F16J 15/3268; F01D 25/186; E21B 10/22; E21B 10/23
USPC ........... 384/92, 95, 114, 119, 129, 261, 276, 384/321, 375, 535–536, 582, 266, 473
See application file for complete search history.

(56) References Cited

U.S. PATENT DOCUMENTS

| | | | | |
|---|---|---|---|---|
| 3,097,823 A * | 7/1963 | Kaiser | ................... | F16K 5/0678 251/172 |
| 3,713,707 A * | 1/1973 | Bennett | ................... | E21B 10/25 384/476 |
| 4,176,848 A * | 12/1979 | Lafuze | ................... | E21B 10/25 384/94 |
| 4,838,365 A * | 6/1989 | Kotch | ................... | E21B 10/25 175/371 |
| 5,080,378 A * | 1/1992 | Kagawa | ................ | C04B 35/565 277/404 |
| 5,251,914 A * | 10/1993 | Tatum | ................... | E21B 10/25 384/94 |
| 5,875,861 A * | 3/1999 | Daly | ...................... | E21B 10/25 384/94 |
| 6,109,376 A * | 8/2000 | Pearce | ................... | E21B 10/25 175/371 |
| 6,176,330 B1 * | 1/2001 | Burr | ........................ | E21B 10/25 175/371 |
| 6,769,491 B2 * | 8/2004 | Zimmerman | ....... | E21B 33/1204 166/138 |
| 6,956,310 B1 | 10/2005 | Knox | | |
| 7,347,290 B2 * | 3/2008 | Yu | .......................... | F16J 15/344 384/94 |
| 7,727,098 B2 * | 6/2010 | Sato | ..................... | F16H 7/0848 474/111 |
| 2002/0043368 A1 * | 4/2002 | Bell | ..................... | E21B 33/1216 166/118 |
| 2009/0196541 A1 * | 8/2009 | Johnson | .................. | E21B 4/003 384/114 |
| 2012/0195542 A1 * | 8/2012 | Marchand | ............... | E21B 4/003 384/606 |
| 2013/0004105 A1 * | 1/2013 | Wenzel | ................... | E21B 4/003 384/321 |

* cited by examiner

*Primary Examiner* — Marcus Charles
(74) *Attorney, Agent, or Firm* — Richard A. Fagin

(57) ABSTRACT

A bearing for a rotary machine includes an inner sleeve providing a first bearing surface and an outer sleeve circumscribing the inner sleeve and providing a second bearing surface in opposing relation to the first bearing surface. The bearing includes at least one tolerance ring for retaining the inner sleeve on a rotor shaft of the rotary machine and another tolerance ring for retaining the outer sleeve on a stator of the rotary machine.

31 Claims, 2 Drawing Sheets

BEARING FOR A ROTARY MACHINE

BACKGROUND

The present disclosure is related to rotating machines such as electric motors. More particularly, the disclosure is related to structures for bearings used to rotatably support rotors of rotating machines in housings.

Rotary machines such as electric motors and pumps have stationary components, e.g., a stator, and a rotating component, such as a rotor on a rotor shaft. In electric motors such as AC induction motors, the stator may include a selected number of steel laminations, typically with a thickness of 0.5 mm or less. Electrical windings pass through shaped openings in the laminations, and the center of the laminations may form a bore in which the rotor is inserted. The rotor may be supported in bearings which are fitted to support the rotor shaft. In the case of an induction motor, the rotor shaft may carry laminations and electrically conductive bars, or in the case of a permanent magnetic motor, the rotor shaft may carry permanent magnets.

For a given electromagnetic design, the power of the rotary machine is generally proportional to the cross-sectional area of the machine (which is proportional to the square of the diameter of the machine), the length of the machine, and the speed of the rotating shaft. Electric motors used in well bores are generally constrained by the internal diameter of well bore conduit such as casing and production tubing. For example, a well bore electric motor may be 76.2 mm (3 inches) to 177.8 mm (7 inches) in diameter, but may be as small as 44.5 mm (1.75 inches) in diameter.

For some rotary machines, such as well bore electric motors, the length of the machine may be large compared to the diameter of the machine in order to fit within the internal diameter of the well bore conduit but still produce sufficient power for the intended purpose of the motor, such as fluid pumping. As an example, the length of a well bore electric motor may be on the order of 3 to 6 meters, even with appropriate measures taken to minimize the length of the motor. Such a long motor may require a plurality of bearings to be installed at spaced apart positions along the rotor shaft to rotatably support the rotor shaft. Typically one bearing is provided about every ¼ meter along the rotor shaft, resulting in typically 12 to 25 bearings in a typical rotor shaft. This presents a challenge for assembling the motor.

As practical matter, it is advantageous to use a small diameter machine at high rotary speeds in order to deliver as much useful power as possible without the machine becoming excessively long. The speed at which a rotary machine can operate reliably is determined in part by the stability of the rotating parts. Critical factors in rotating component dynamic performance are rotating mass, rotor shaft stiffness, bearing separation, bearing radial stiffness and bearing damping. Rotating mass is generally fixed by electromagnetic design considerations. Rotor shaft stiffness is principally related to the rotor shaft diameter, which generally cannot be increased for any selected external diameter motor without compromising the electromagnetic design. Small bearing separation will reduce the unsupported length of shaft and increase stability. However, it is generally preferable that bearing separation is as large as possible to keep the number of bearings to a minimum and thereby avoid excessive cost, friction, drag, and manufacturing complexity.

For small diameter, long rotary machines, such as well bore electric motors, where the shaft diameter is limited and shaft stiffness is impracticable to increase by increasing the rotor shaft diameter, bearing radial stiffness and damping become limiting factors that determine the safe operating speed of the machine. In such rotary machines, bearings that provide greater radial stiffness are desirable to maintain the rotor shaft stability at high rotational speeds.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
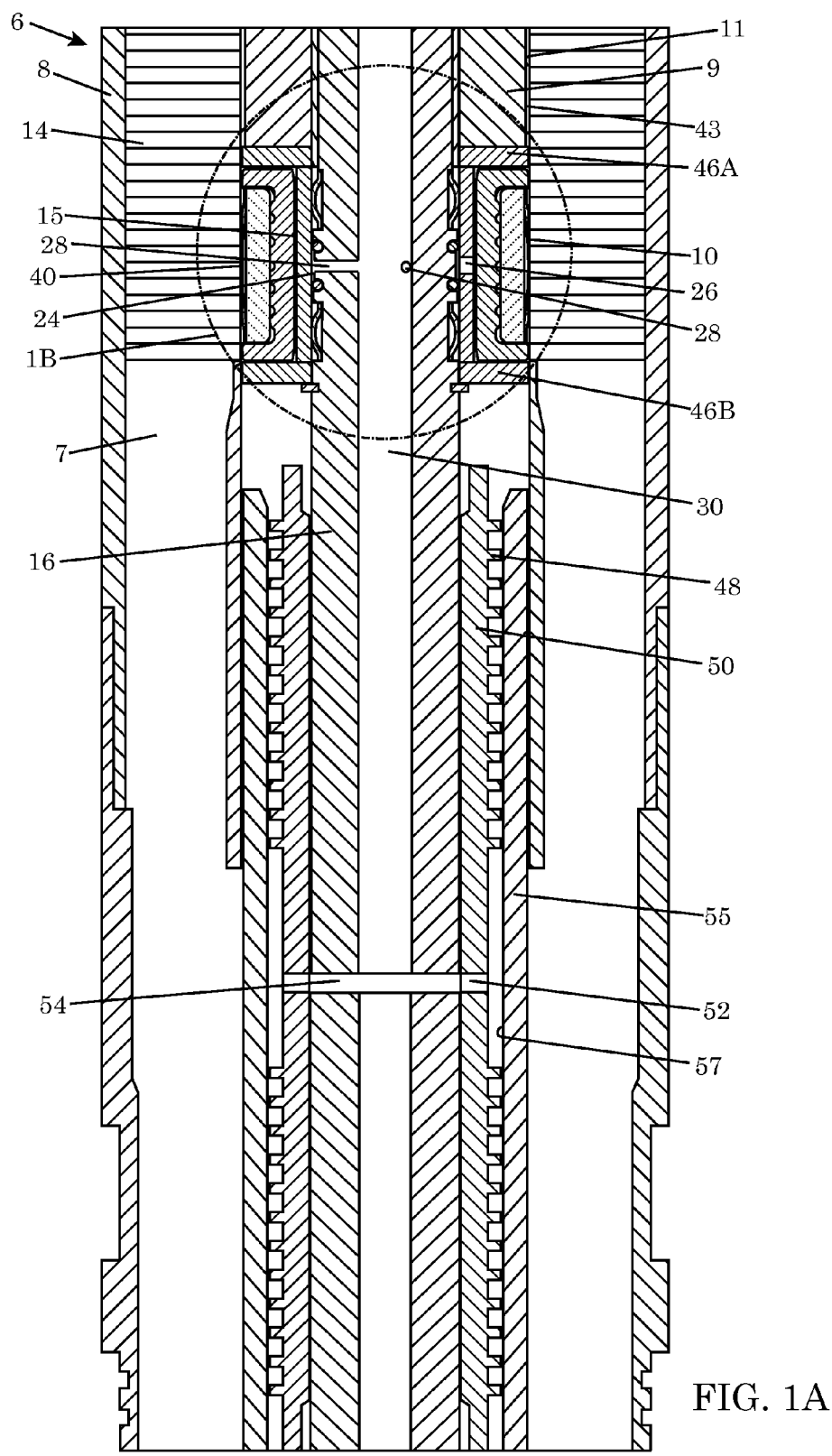
FIG. 1A shows a bearing assembly installed between a stator and a rotor shaft of a rotary machine according to one illustrative embodiment.

The present disclosure relates to a bearing having improved radial stiffness and damping to enable rotary machines, especially small diameter, long rotary machines, such as typical well bore electric motors, to operate safely at higher speeds, and thus produce power more effectively. The bearing uses features such as tolerance rings and elastomer rings to improve radial stiffness. The ability to easily install the bearing on a shaft and to install the bearing and shaft in a stator is an aspect of the disclosure. Controlled oil circulation is another aspect of the disclosure.

An aspect or embodiment of the present disclosure relates to a bearing for a rotary machine, comprising: an inner sleeve providing a first bearing surface; an outer sleeve circumscribing the inner sleeve and providing a second bearing surface in opposing relation to the first bearing surface; at least one first tolerance ring for retaining the inner sleeve on a rotor shaft of the rotary machine; and at least one second tolerance ring for retaining the outer sleeve on a stator of the rotary machine.

The bearing may further comprise a ring disposed on the outer sleeve in some embodiments.

The outer sleeve may comprise a circumferential recess formed therein. The ring may be disposed in the recess in some embodiments.

The ring disposed on the outer sleeve may comprise a resilient material, such as an elastomer in some embodiments.

The ring disposed on the outer sleeve may comprise a swellable material in some embodiments. The swellable material of the ring may be swellable upon exposure to a fluid, such as a lubricating fluid, for example lubricating oil. The ring may comprise a swellable elastomer. The ring may comprise, in some embodiments, an oil swellable material, such as ethylene propylene diene monomer (EPDM).

The second tolerance ring may be mounted in contact with the ring disposed on the outer sleeve.

The bearing may comprise a fluid path formed in the outer sleeve for circulating fluid around the ring disposed on the outer sleeve. The fluid may comprise a lubricant, such as lubricating oil. The fluid may cause swelling of the ring.

The fluid path may comprise a spiral groove in some embodiments.

The bearing may comprise at least one ring proximate to the at least one first tolerance ring. The at least one ring may function to damp a mounting of the at least one first tolerance ring in some embodiments.

The at least one ring may comprise a resilient material. The at least one ring may comprise an elastomer in some embodiments.

The bearing may comprise a pair of first tolerance rings for retaining the inner sleeve on the rotor shaft.

The bearing may comprise a pair of rings, each ring being proximate one of the first tolerance rings for example for damping a mounting of the respective one of the first tolerance rings.

At least one of the pair of rings may comprise a resilient material. At least one of the rings may comprise an elastomer.

The first and second bearing surfaces may be arranged to slidingly engage. The first and second sleeves may define a journal bearing in some embodiments.

The bearing may comprise one or more rolling bodies interposed between the first and second bearing surfaces.

An aspect or embodiment of the present disclosure relates to a rotary machine, comprising: a housing; a stator disposed within a bore of the housing; a rotor shaft disposed within a bore of the stator; and at least one bearing disposed between the stator and the rotor shaft, the bearing comprising an inner sleeve providing a first bearing surface and an outer sleeve providing a second bearing surface in opposing relation to the first bearing surface, the inner sleeve being retained on the rotor shaft by at least one first tolerance ring, the outer sleeve being retained on the stator by a second tolerance ring.

At least one bearing may be provided in accordance with any other aspect.

The inner sleeve may be retained on the rotor shaft by a pair of first tolerance rings disposed in axially spaced apart relation between the inner sleeve and rotor shaft.

The rotary machine may comprise a pair of rings disposed in axially spaced apart relation between the rotor shaft and the inner sleeve, thereby forming a fluid chamber between the rotor shaft and the inner sleeve.

At least one of the pair of rings may comprise a resilient material. At least one of the pair of rings may comprise an elastomer.

The inner sleeve may be provided with at least one orifice in communication with the fluid chamber and the first bearing surface.

The rotor shaft may be provided with a longitudinal bore in communication with the fluid chamber.

The rotor shaft may be provided with at least one orifice at the location of the at least one bearing to provide fluid communication between the longitudinal bore of the shaft and the fluid chamber.

The rotary machine may comprise a fluid drive arrangement for driving a lubricant from a reservoir into the bore of the rotor shaft.

The reservoir may be at least partially defined within the bore of the stator.

The fluid drive arrangement may circulate lubricant along a lubricant path within the rotary machine. The lubricant path may be defined at least partially by the reservoir, the bore of the rotor shaft and the at least one bearing.

The rotary machine may comprise a plurality of bearings. The fluid drive arrangement may circulate lubricant along a lubricant path which is defined at least partially by the reservoir, the bore of the rotor shaft and at least two of the plurality of bearings.

The rotor shaft may be provided with at least one first orifice at the location of a first bearing to permit communication of lubricant from the bore of the rotor shaft to said first bearing. The rotor shaft may be provided with at least one second orifice at the location of a second bearing to permit communication of lubricant from the bore of the rotor shaft to said second bearing.

The at least one first orifice and the at least one second orifice may define different flow geometries, such as dimensions, to provide control over flow of lubricant from the bore of the rotor shaft to the first and second bearings. Such control may assist to balance flow between the first and second bearings.

The fluid drive arrangement may comprise a screw member for impelling lubricant from the reservoir into the bore of the rotor shaft.

The rotary machine may comprise a sleeve circumscribing the screw member. The sleeve may provide a close fit relative to screw features of the screw member. This may improve efficiency of transferring oil within the rotary machine.

The screw member may be disposed within the bore of the housing.

The rotor shaft may comprise a first shaft section and a second shaft section. The first and second shaft sections may be secured together in end-to-end relationship by a coupling member. In one embodiment the first and second shaft sections may be secured together by the screw member. The screw member may thus also function as a shaft coupling member.

The screw member may comprise one or more screw features for driving lubricant. The screw features may extend in a single spiral direction. In some embodiments a first screw feature may extend in a first spiral direction, and a second screw feature may extend in a second, opposite spiral direction. Such an embodiment may permit lubricant to be driven in opposing directions simultaneously, for example during a common rotation direction of the rotor shaft.

The first and second shaft members may be secured together with an axial separation gap defined therebetween, wherein the screw member spans said axial separation gap. The screw member may define one or more orifices therethrough to provide communication with the axial separation gap. In such an arrangement lubricant may be communicated into the bore of the shaft via the one or more orifices in the screw member and the separation gap between the first and second shaft sections.

An embodiment or aspect of the present disclosure relates to a rotary machine comprising: a stator; a rotor shaft disposed within a bore of the stator; at least one bearing disposed between the stator and the rotor shaft, the bearing comprising an inner sleeve providing a first bearing surface and an outer sleeve providing a second bearing surface in opposing relation to the first bearing surface; and a fluid drive arrangement for driving lubricant at least across the first and second bearing surfaces.

Features defined In relation to one aspect may be provided in combination with any other aspect.

It is to be understood that both the foregoing overview and the following detailed description are only to present example embodiments according to the present disclosure and not to limit their scope. The accompanying drawings are included to provide a further understanding of the described embodiments but are not to be construed as limiting the scope of the present disclosure.

FIG. 1A shows a rotary machine 6 including a housing 8 and a housing bore 7 and a rotor 9 arranged within a stator bore 11 of a stator 14. The rotary machine 6 may be an electric motor. In some embodiments, the rotary machine 6 may be a well bore electric motor suitable for use in a well bore with a submersible pump coupled at a fluid outlet thereof to a well bore tubing. In one example embodiment, a bearing assembly 10 is arranged within the stator bore 11 to support rotation of a shaft 16 of the rotor 9. In general, one or more bearing assemblies 10 may be arranged along the rotor shaft 16 as needed, depending on the length of the shaft 16.

Figure 1B:
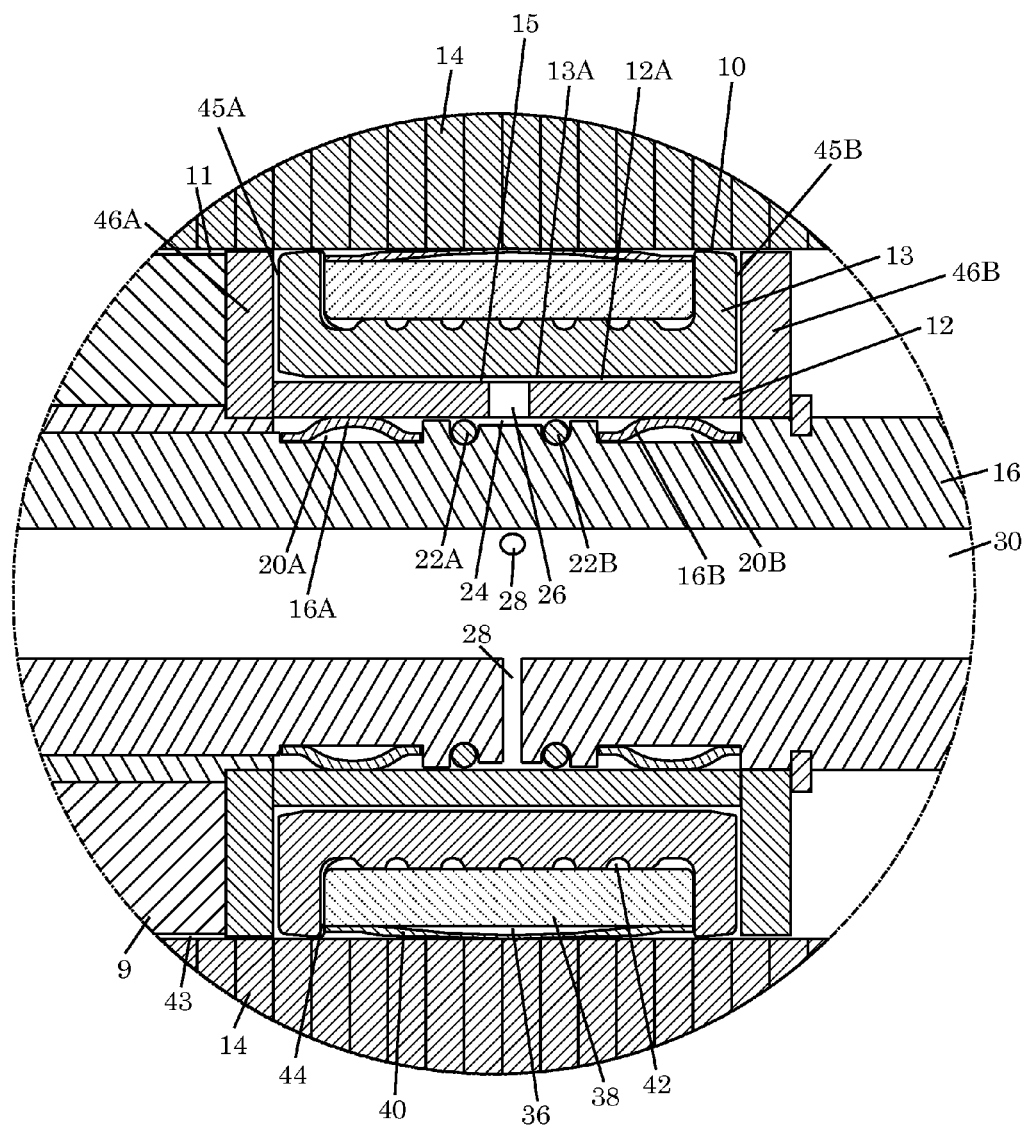
FIG. 1B shows an enlarged view of section 1B of FIG. 1A.

Referring to FIG. 1B, in one illustrative embodiment, the bearing assembly 10 includes an inner sleeve 12 and an outer sleeve 13. The inner sleeve 12 circumscribes a portion of the rotor shaft 16, and the outer sleeve 13 circumscribes the inner sleeve 12 and is located between the inner sleeve 12 and the stator 14. The inner sleeve 12 provides a rotating surface 12A of, e.g., a journal bearing 15, and the outer sleeve 13 provide a non-rotating surface 13A of the journal bearing 15 when a journal bearing is used. The inner sleeve 12 may be mounted on the rotor shaft 16 by a pair of inner tolerance rings 16A, 16B. The inner tolerance rings 16A, 16B may be axially spaced apart along the inner sleeve 12. The inner tolerance rings 16A, 16B may be disposed partially in circumferential recesses 20A, 20B formed in the portion of the rotor shaft 16 circumscribed by the inner sleeve 12.

A tolerance ring may be described as a radial spring that acts as an interface between two mating components to hold the two mating components together. The tolerance ring in some embodiments may be made from a thin spring strip of material in which waves are formed. The waves may be in the form of corrugations, bumps, and the like. The spring strip may be cut to a selected length and curled into a ring shape. Tolerance rings may be made from steel or stainless steel, but may also be made from other alloys. When the tolerance ring is mounted between mating components, each wave on the tolerance ring is elastically deflected, resulting in a retention force that holds the mating components together. The retention capacity of a particular tolerance ring is the resultant force of all the waves and the coefficient of friction of the tolerance ring material with the mating components described above.

Examples of tolerance rings that may be used in some embodiments are available from commercial sources such as USA Tolerance Rings, 85 Route 31 North Pennington, N.J. For example, the foregoing supplier provides model designation "AN" tolerance rings with inward facing waves and model designation "BN" rings with outward facing waves. The model AN rings are biased to open in the free state so that when they are installed inside a bore they conform to the interior surface of the bore and are self-retained in the bore. The model BN rings are designed for mounting on a shaft and are biased to close so that they are self-retaining when mounted on an exterior surface of the shaft. In the example shown in FIG. 1B, the waves on the inner tolerance rings 16A, 16B face the inner sleeve 12. The orientation of the waves is not critical to the function of the tolerance rings 16A, 16B.

The bearing assembly 10 may further include a pair of elastomer rings, e.g., O-rings, 22A, 22B. In the example mounted position shown in FIG. 1B, the elastomer rings 22A, 22B may be located between the inner sleeve 12 and the shaft 16, proximate to the inner tolerance rings 16A, 16B. The elastomer rings 22A, 22B in the present example may be axially spaced apart along the inner sleeve 12 to form a narrow circumferential chamber 24 between the shaft 16 and the inside diameter of the inner sleeve 12. An orifice 26 in the inner sleeve 12 connects the chamber 24 to the bearing surface 12A. The chamber 24 is also in communication with a longitudinal bore 30 of the shaft 16 through radial orifices 28 in the wall of the shaft 16. Lubrication oil may be pumped into the bore 30 of the shaft 16 and may thereby flow out of the radial orifices 28 into the chamber 24. The chamber 24 will guide the lubricating oil to the orifice 26 and then to the center of the journal bearing 15, thereby lubricating the journal bearing surfaces 12A, 13A.

The outer sleeve 13 may include a circumferential recess 36 in which a thin elastomeric ring 38 is mounted. The elastomer ring 38 provides damping and isolation to absorb vibration energy from the bearing reaction forces. An outer tolerance ring 40 is mounted between the outer sleeve 13 and the stator 14 to retain the outer sleeve 13 on the stator 14. In one embodiment, the outer tolerance ring 40 is mounted so as to be in contact with the elastomer ring 38, and the thickness of the elastomer ring 38 may be adjusted to provide the desired bearing stiffness. The elastomer ring 38 may be made of a material which will swell when immersed in oil so that it will apply pressure to the tolerance ring 40 and thereby increase the radial stiffness of the bearing. The wave(s) on the outer tolerance ring 40 may face the stator 14 as shown in FIG. 1B. However, the orientation of the waves is not critical to the function of the tolerance ring 40. Although the outer sleeve 13 is shown as retained on the stator 14 with one outer tolerance ring 40, it is possible in other embodiments to retain the outer sleeve 13 on the stator 14 with more than one tolerance ring.

A spiral groove 42 is formed in the outer sleeve 13, at the base of the recess 36. The spiral groove 42 is in communication with a circumferential gap 43 between the rotor 9 and stator 14 by slots 44 formed in the outer sleeve 13. (The slots 44 are 180° apart. Therefore, only one of the slots 44 is visible in FIG. 1B.) This will allow lubricating oil to flow into the spiral groove 42 and contact the elastomer ring 38 to encourage quick and even expansion of the elastomer ring 38. The material of the elastomer ring 38 is selected to react with the oil and swell. One example elastomer material is ethylene propylene diene monomer (EPDM) rubber. In one example, the elastomer ring has a radial clearance of 0.13 mm (0.005 inches) inside the stator bore 11 before swelling. A typical swelling characteristic is about 10% increase in volume over 12 to 24 hours immersion in motor oil.

The bearing assembly 10 may have thrust faces 45A, 45B shown in FIG. 1B at its opposite ends that bear on thrust washers 46A, 46B.

Proper lubrication of the bearing surfaces is important to bearing life and machine performance. Returning to FIG. 1A, oil is pumped through the bore 30 of the rotor shaft 16 by screw features 48, e.g., threads, on shaft coupling members 50 arranged on both ends of the rotor shaft 16 (only one end of the shaft 16 is shown in FIG. 1A) Each shaft coupling member 50 has holes 52 that are in communication with a gap 54 at an end of the shaft 16. The screw features 48 on each shaft coupling member 50 may be left- and right-handed to drive the oil from both ends of the coupling member 50 towards the center where the holes 52 are located, where the oil will flow through the holes 52 into the gap 54. The left handed and right handed threads are arranged with respect to the direction of rotation of the machine for the oil to be pumped in the correct direction. A sleeve 55 circumscribes each shaft coupling member 50. The bore 57 of the sleeve 55 is a close fit to the outer diameter of the screw features 48 to make the screw features 48 more effective in transferring oil towards toward the gap 54 and into the bore 30 of the rotor shaft 16.

As described above, oil flows out of the bore 30 through the radial orifices 28 in the rotor shaft 16, through the narrow circumferential chamber 24 formed by the elastomer rings 22A, 22B (see FIG. 1B), through the orifice 26 in the inner sleeve 12, to the center of the journal bearing 15. The oil flows across the width of the journal bearing 15, across the thrust washers 46A, 46B and along the circumferential gap 43, to return to the screw features 48. Oil returns along the circumferential gap 43, bypassing other bearings through passageways formed by fit of the waves in the tolerance ring (e.g., outer tolerance ring 40) in the stator bore 11.

The pressure differential to cause oil circulation is created by the screw features 48 impelling the oil flow into the bore 30 of the shaft 16 and the centrifugal effect at the radial orifices 28 in the wall of the shaft 16 at each bearing assembly 10. The radial orifices 28 may vary in size at each bearing position along the shaft 16 to balance the flow more or less equally in all bearings, taking into account that the pressure drop across each bearing may be different because of the different length of circumferential gap through which the oil has to flow and the number of bearings past which the oil has to flow to return to the end of the shaft.

In order to resist wear and erosion by any microscopic debris in the lubricating oil, the inner sleeve 12 and outer sleeve 13 may be made of or coated with hard materials, for example, tungsten carbide or cubic boron nitride. The bearing surfaces 12A, 13A may be finished to a high surface finish with Ra values between 0.2 and 0.8 µm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A bearing for a rotary machine, comprising:
   an inner sleeve providing a first bearing surface;
   an outer sleeve circumscribing the inner sleeve and providing a second bearing surface in opposing relation to the first bearing surface;
   at least one first radially biased radial spring disposed on an outer surface of a rotor shaft of the rotary machine for retaining the inner sleeve on the rotor shaft; and
   at least one second radially biased spring in contact with an inner surface of a stator of the rotary machine for retaining the outer sleeve on the stator shaft.

2. The bearing of claim 1, further comprising a ring disposed on the outer sleeve.

3. The bearing of claim 2, wherein the outer sleeve comprises a circumferential recess formed therein, and the ring is disposed in the recess.

4. The bearing of claim 2, wherein the ring comprises an elastomer ring.

5. The bearing of claim 2, wherein the second radially biased spring is mounted in contact with the ring.

6. The bearing of claim 2, further comprising a fluid path formed in the outer sleeve for circulating fluid around the ring.

7. The bearing of claim 6, wherein the fluid path comprises a spiral groove.

8. The bearing of claim 1, further comprising at least one ring proximate to the at least one first radially biased spring for damping a mounting of the at least one first radially biased spring.

9. The bearing of claim 8, wherein the at least one ring comprises an elastomer ring.

10. The bearing of claim 1, further comprising at least one additional first radially biased spring for retaining the inner sleeve on the rotor shaft.

11. The bearing of claim 10, further comprising a pair of rings, each ring being proximate one of the first first radially biased springs for damping a mounting of the respective one of the first radially biased springs.

12. The bearing of claim 11, wherein at least one of the pair of rings comprises an elastomer ring.

13. The bearing of claim 1 wherein at least one of the first and second radially biased springs comprises a tolerance ring.

14. A rotary machine, comprising:
   a housing;
   a stator disposed within a bore of the housing;
   a rotor shaft disposed within a bore of the stator; and
   at least one bearing disposed between the stator and the rotor shaft, the bearing comprising an inner sleeve providing a first bearing surface and an outer sleeve providing a second bearing surface in opposing relation to the first bearing surface, the inner sleeve being retained on the rotor shaft by, at least one first radially biased spring, the outer sleeve being retained on the stator by at least one second radially biased spring.

15. The rotary machine of claim 14, further comprising at least one additional first radially biased spring disposed in axially spaced relation to the at least one first radially biased spring between the inner sleeve and rotor shaft to retain the inner sleeve on the rotor shaft.

16. The rotary machine of claim 14, further comprising a pair of rings disposed in axially spaced apart relation between the rotor shaft and the inner sleeve, thereby forming a fluid chamber between the rotor shaft and the inner sleeve.

17. The rotary machine of claim 16, wherein at least one of the pair of rings comprises an elastomer ring.

18. The rotary machine of claim 16, wherein the inner sleeve is provided with at least one orifice in communication with the fluid chamber and the first bearing surface.

19. The rotary machine of claim 16, wherein the rotor shaft is provided with a longitudinal bore in communication with the fluid chamber.

20. The rotary machine of claim 19, wherein the rotor shaft is provided with at least one orifice at the location of the at least one bearing to provide fluid communication between the longitudinal bore of the shaft and the fluid chamber.

21. The rotary machine of claim 19, further comprising a fluid drive arrangement for driving a lubricant from a reservoir into the bore of the rotor shaft.

22. The rotary machine of claim 21, wherein the reservoir is at least partially defined within the bore of the stator.

23. The rotary machine of claim 21, wherein the fluid drive arrangement circulates lubricant along a lubricant path which is defined at least partially by the reservoir, the bore of the rotor shaft and the at least one bearing.

24. The rotary machine of claim 21, comprising a plurality of bearings, wherein the fluid drive arrangement circulates lubricant along a lubricant path which is defined by the reservoir, the bore of the rotor shaft and at least two of the plurality of bearings.

25. The rotary machine of claim 24, wherein the rotor shaft is provided with at least one first orifice at the location of a first bearing to permit communication of lubricant from the bore of the rotor shaft to said first bearing, and at least one second orifice at the location of a second bearing to permit communication of lubricant from the bore of the rotor shaft to said second bearing.

26. The rotary machine of claim 25, wherein the at least one first orifice and the at least one second orifice define different flow geometries to provide control over flow of lubricant from the bore of the rotor shaft to the first and second bearings.

27. The rotary machine of claim 21, wherein the fluid drive arrangement comprises a screw member for impelling lubricant from the reservoir into the bore of the rotor shaft.

28. The rotary machine of claim 27, further comprising a sleeve circumscribing the screw member.

29. The rotary machine of claim 27, wherein the screw member is disposed within the bore of the housing.

30. The rotary machine of claim 27, wherein the rotor shaft comprises a first shaft section and a second shaft section, wherein the screw member connects the first and second shaft sections together in end-to-end relation.

31. The rotary machine of claim 14 wherein at least one of the first and second radially biased springs comprises a tolerance ring.

* * * * *